United States Patent [19]
Whitmore

[11] 3,751,987
[45] Aug. 14, 1973

[54] DYNAMIC BALANCING MACHINES

[76] Inventor: Brian Edward Whitmore, 7, The Croftway, Handsworth Wood, England

[22] Filed: June 29, 1971

[21] Appl. No.: 158,043

[30] Foreign Application Priority Data
July 7, 1970 Great Britain .................. 32,856/70

[52] U.S. Cl. .................................................. 73/465
[51] Int. Cl. .................................................. G01m 1/22
[58] Field of Search ............................. 73/462, 465

[56] References Cited
UNITED STATES PATENTS
3,336,809  8/1967  Hack .................................. 73/462
3,554,061  1/1971  Holdinghausen ................. 73/465 X
3,331,252  7/1967  Thomas et al. .................... 73/462
3,349,257  10/1967  Thomas et al. ................. 328/27

Primary Examiner—James J. Gill
Attorney—W. G. Fasse

[57] ABSTRACT

The present circuit arrangement provides a control signal or control signals for an automatic balancing machine, which signals are displayed on the screen of a cathode ray tube preferably in the manner of a plan position indicator. The displayed signal is produced from a balance information signal and a reference information signal supplied to the inputs of a multiplier circuit the outputs of which are connected to a display circuit which in turn is connected to control a cathode ray tube.

15 Claims, 23 Drawing Figures

3,751,987

INVENTOR
BRIAN EDWARD WHITMORE

BY *W. G. Fasse*

ATTORNEY

INVENTOR
BRIAN EDWARD WHITMORE

BY W. G. Fosse

ATTORNEY

INPUT SIGNALS TO THE COMPARATOR

MULTIPLIER OUTPUT

INVENTOR
BRIAN EDWARD WHITMORE

BY *W. G. Fosse*

ATTORNEY

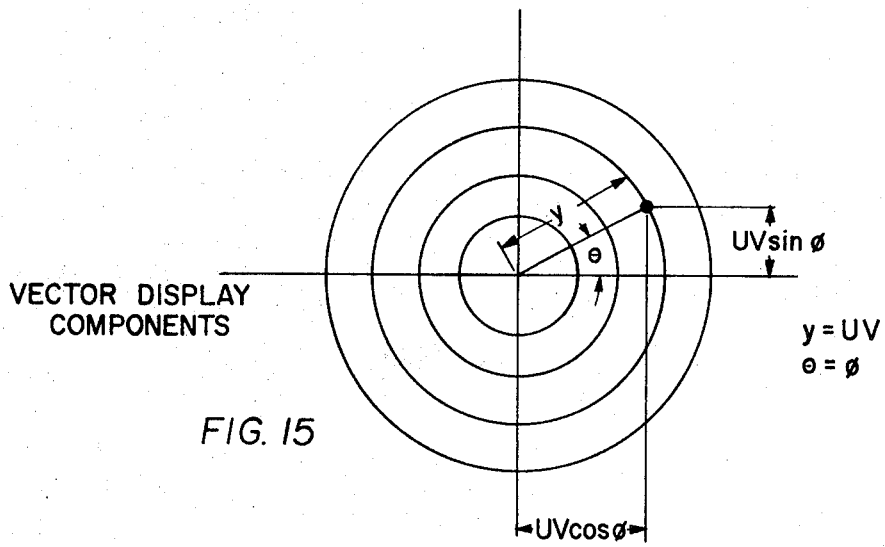
FIG. 15 VECTOR DISPLAY COMPONENTS
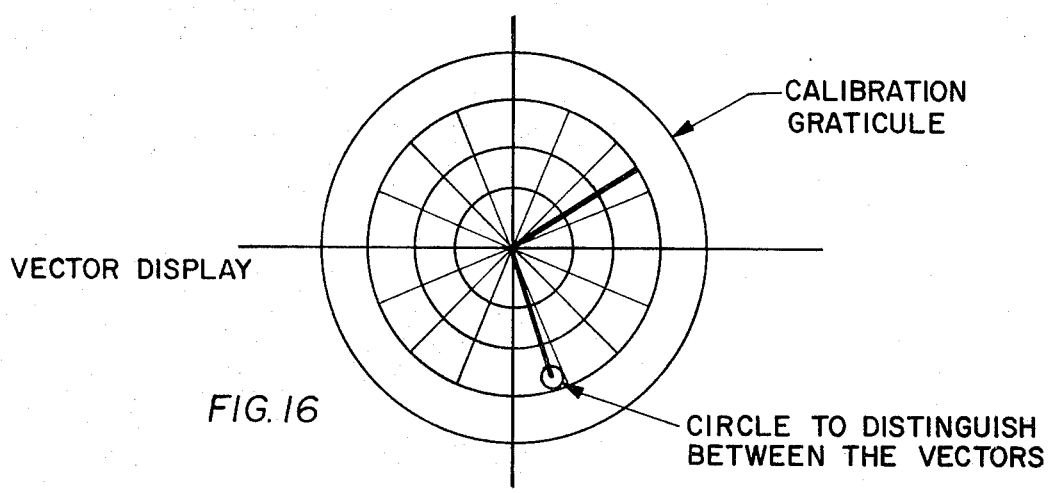
FIG. 16 VECTOR DISPLAY

INVENTOR
BRIAN EDWARD WHITMORE
BY
W. G. Fasse
ATTORNEY 3,751,987

DYNAMIC BALANCING MACHINES

BACKGROUND OF THE INVENTION

The present invention relates to an electronic circuit arrangement especially for automatically controlling a dynamic balancing machine. More specifically, the present circuit arrangement provides a cathode ray tube display of one or more control signals in the manner of a plan position indicator.

Prior art high precision dynamic balancing machines comprise electromagnetic transducers mounted to the bearings on which a workpiece is supported, as well as a reference generator coupled to the workpiece. The signals provided by the electromagnetic transducers contain information which is proportional to the out of balance forces existing at each bearing. This unbalance information usually must be recovered from a high noise level. Conventionally, such recovery is accomplished by a phase sensitive rectifier method or by means of a watt meter.

In the phase sensitive rectifier method, the signal is demodulated by the signal supplied by the reference generator and output voltages are produced proportional to the out of balance force. This prior art method has the disadvantage that harmonic signal components can cause considerable errors.

In the other prior art method which employs an electrodynamic or an electrodynamic-optical watt meter, the reference voltages and the unbalance representing signal are supplied to the coils of a watt meter to provide a polar display, for example in response to a two dimensional reflection of a light spot proportional to the magnitude and phase of the unbalance. In this method employing a watt meter, it is necessary to provide storage means. Besides, although the watt meter is substantially not sensitive to harmonic signal components, the output information is available only as a deflection of the light spot or as a very low torque needle reflection.

OBJECTS OF THE INVENTION

In view of the foregoing it is the aim of the invention to achieve the following objects, singly or in combination:

to overcome the outlined drawbacks of the prior art;
to provide an electronic circuit arrangement which will combine two signals in such a manner that the resulting signal comprises the information content of both combined signals whereby the resulting signal may be used, for example for display and/or control purposes;
to combine a reference information containing signal with a quantity information containing signal in such a manner that the resulting combined signal may be displayed on the screen of a cathode ray tube;
to display a multi-information representing signal on the screen of a cathode ray tube in a polar coordinate system in the manner of a plan position indicator;
to provide an electronic circuit arrangement for the display of a resulting combined signal on the screen of a cathode ray tube which is so calibrated that the length of the light display represents the amount of an unbalance while the angular position of the light display relative to a polar coordinate system represents the location of the unbalance on a rotating workpiece relative to a reference location on said workpiece;
to provide a circuit arrangement for converting a digital signal, for example a reference signal, into an approximation of a sinusoidal analogue signal;
to provide an electronic multiplier circuit arrangement which will combine a reference signal and a value representing signal to produce an output signal suitable for further use such as the control of an automatic unbalance correcting machine;
to provide an electronic circuit arrangement for displaying on the screen of a cathode ray tube at least two separate signals each of which represents the information content of two separate initial signals whereby the displayed signals must be distinguishable from each other as to which initial signals are combined in the particular displayed signal;
to provide an electronic multiplier circuit which provides an output signal the amplitude of which is independent of frequency although the amplitudes of the signals fed into the multiplier circuit are frequency dependent;
to provide an electronic circuit arrangement for combining two information representing signals whereby noise components and harmonic components of the signals to be combined must not cause an error in the resulting combined signal and such components as such must not cause an output signal;
to provide an electronic circuit arrangement for combining two information containing signals and displaying a resulting signal which display will provide a threefold information;
to provide, especially in connection with automatic balancing machines, a signal display which indicates as the result of the combination of two information containing signals, the size of a required correction mass, the radius from the center line or rotational axis of a workpiece as well as the angle relative to a zero rotational orientation, at which said correction mass is to be applied to the workpiece for balancing it;
to provide an electronic circuit arrangement which produces an output signal, preferably a displayed output signal, representing a plurality of information components, from at least two input signals individually representing said information components; and
to provide an electronic multiplier circuit which will produce an output signal, preferably a d.c. output signal, only when the signals applied to the multiplier input terminals have the same frequency.

SUMMARY OF THE INVENTION

According to the invention, the above objects have been achieved by means of an electronic circuit arrangement comprising transducer means as well as reference signal means connected to respective inputs of an electronic multiplier circuit. The reference signal means produce sine and cosine wave-forms having a frequency corresponding to the rotation of the workpiece. The electronic multiplier circuit, preferably an analogue multiplier circuit, produces an output signal in response to the common frequency components of the reference signals and of the signals produced by said transducer means whereby the output signal is proportional to the product of the transducer produced signals times the reference signals times the cosine of the angle between these signals. The output signal is displayed on a cathode ray tube, preferably in the manner of a plan position indicator. Further, the output signal may be used for controlling an automatic balancing operation.

It will be appreciated that the transducer means respond to the unbalance of the workpiece and that the reference signal means detect a zero rotational orientation of the workpiece whereby the unbalance causing condition in the workpiece may be located by an angle relative to such zero rotational orientation. Said electronic multiplier circuit produces an output voltage only when the signal components at its input have the same frequency. The magnitude of the d.c. output voltage at the output of the multiplier circuit is proportional to the product of the peak values of the input components having the same frequency times the cosine of the phase difference between the signal components.

BRIEF FIGURE DESCRIPTION

In order that the invention may be clearly understood, it will now be described, by way of example, with reference to the accompanying drawings, wherein.

Figure 1:
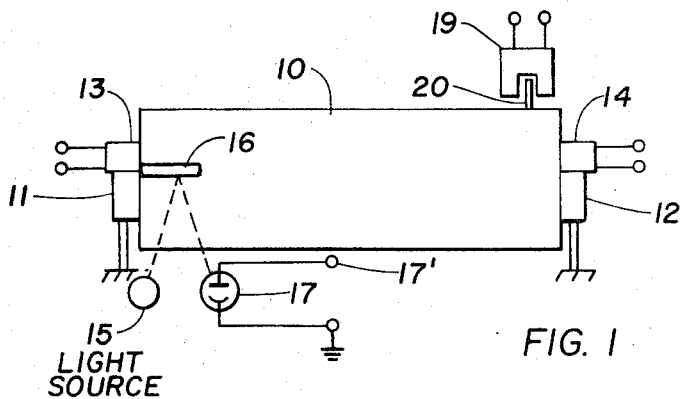
FIG. 1 is a schematic side view of a bearing supported workpiece to be balanced and showing the transducers for producing unbalance signals as well as digital reference pulses.
Figure 3:
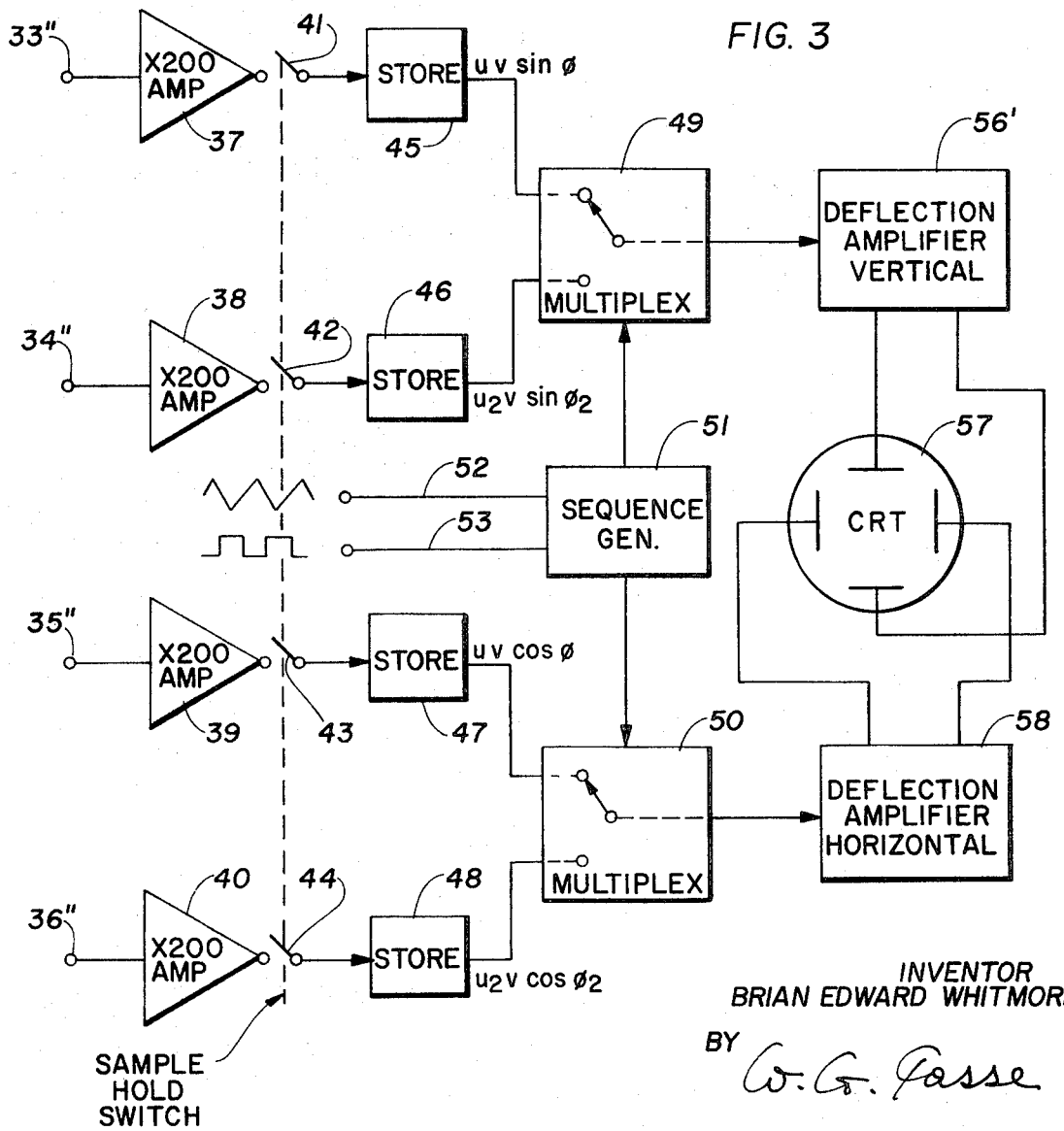
FIGS. 2 and 3 are to be taken together since they represent an overall block diagram of the electronic circuit arrangement according to the present invention.
Figure 2:
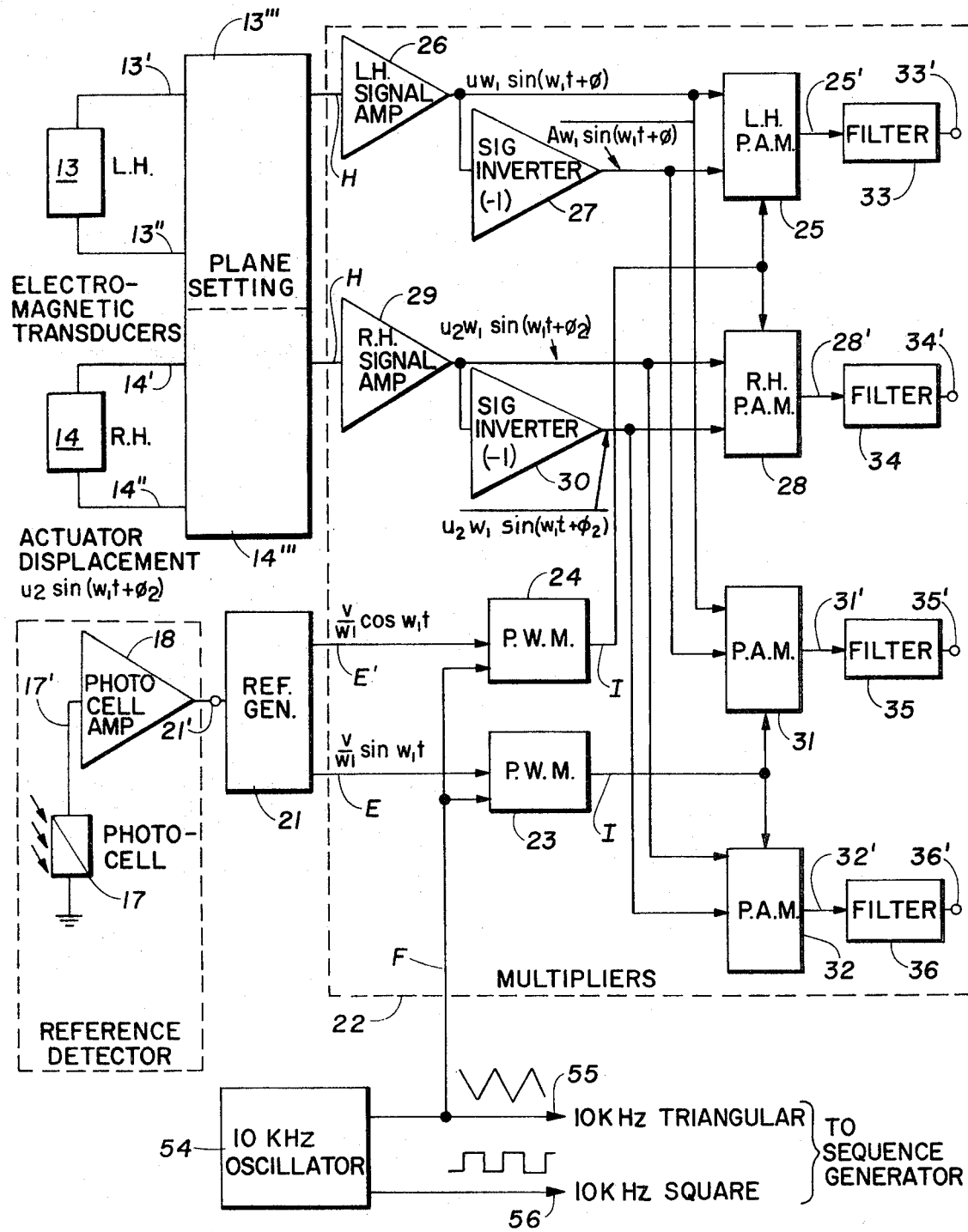
Figure 6:
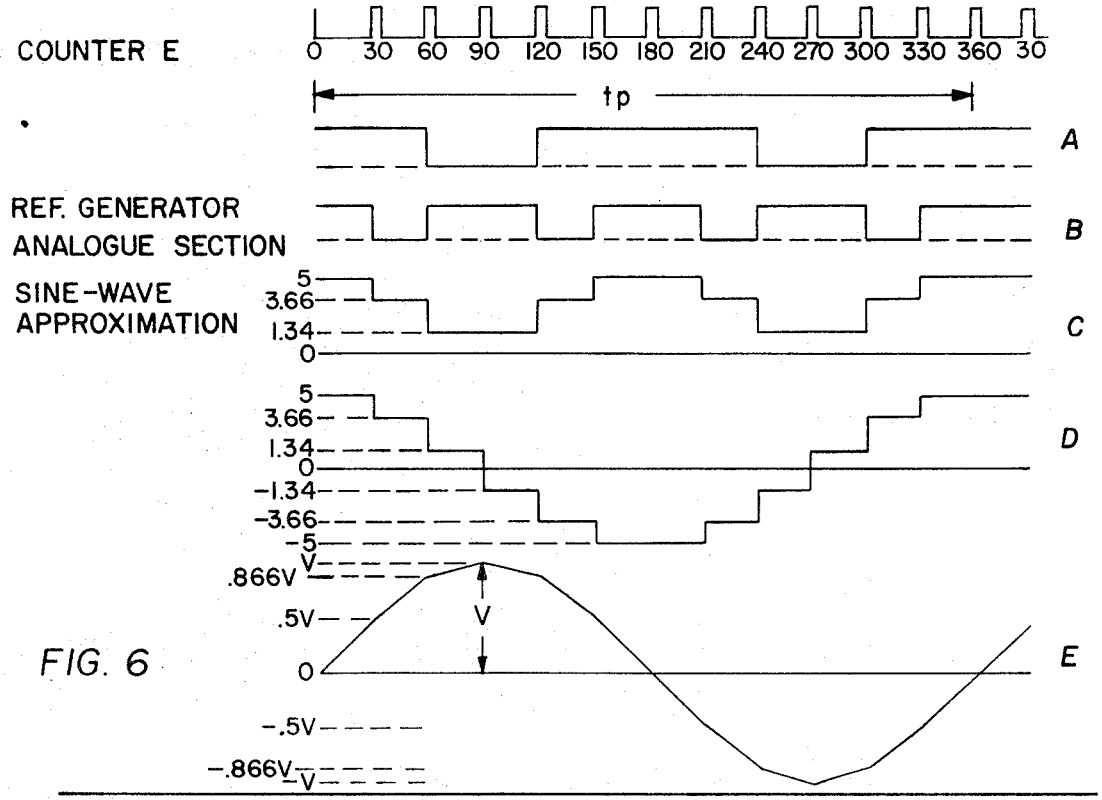
Figure 7:
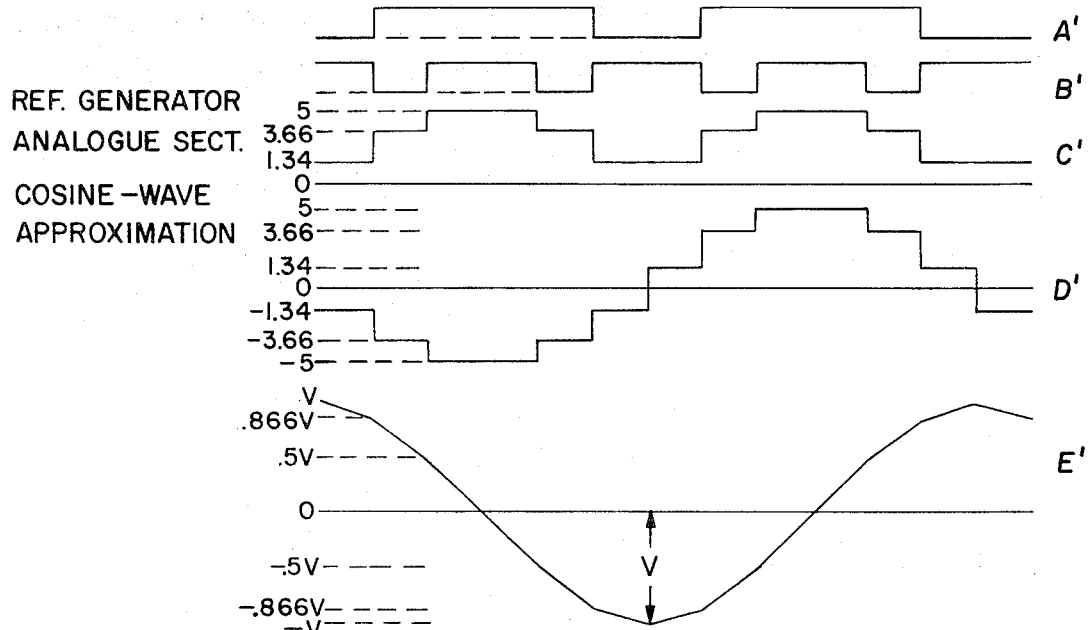
Figure 8:
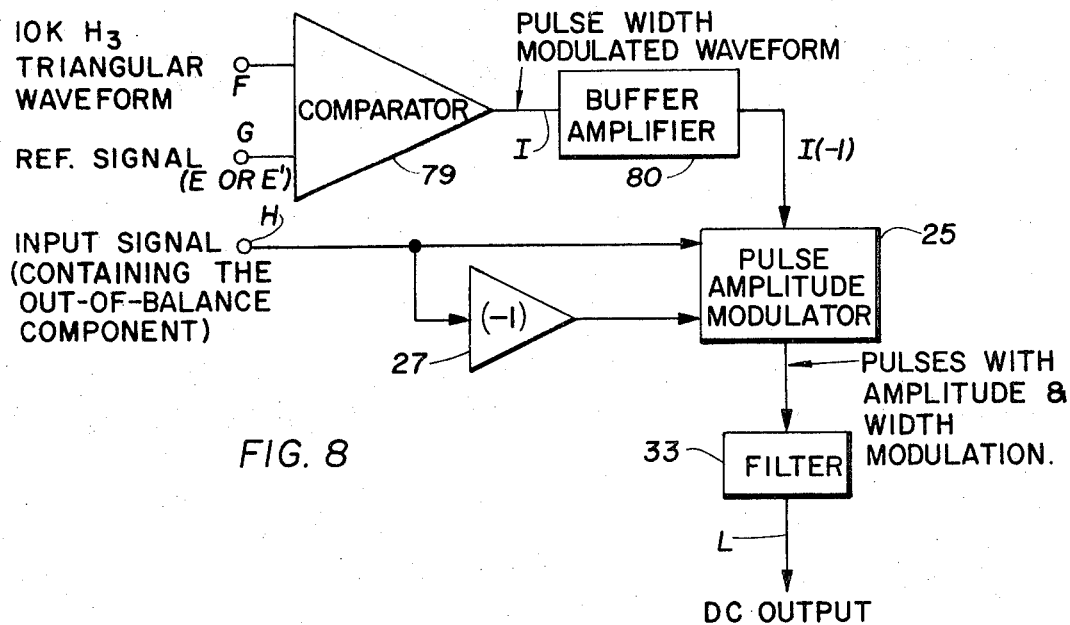
Figure 9:
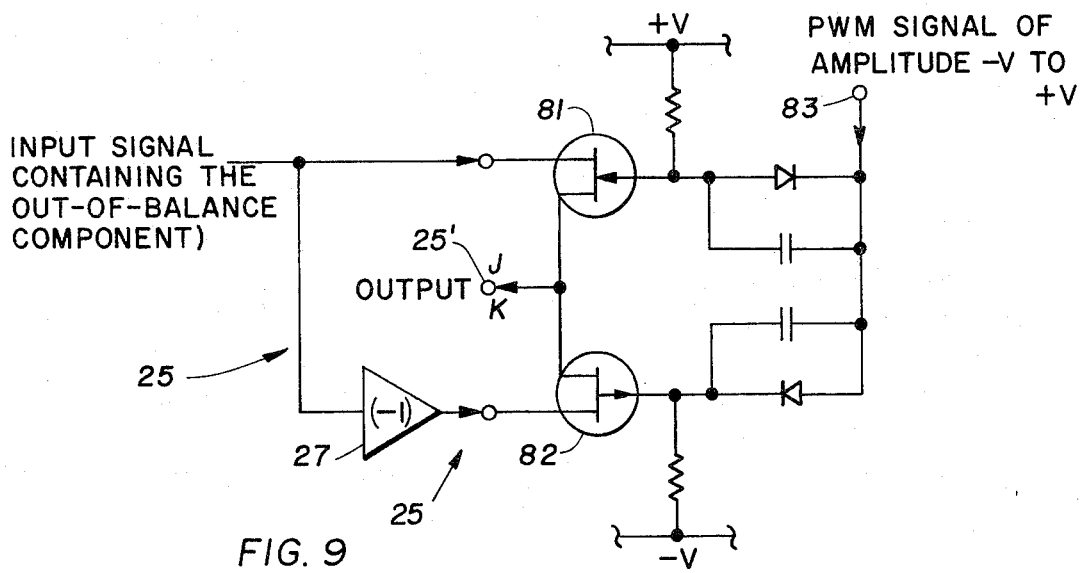
Figure 10A:
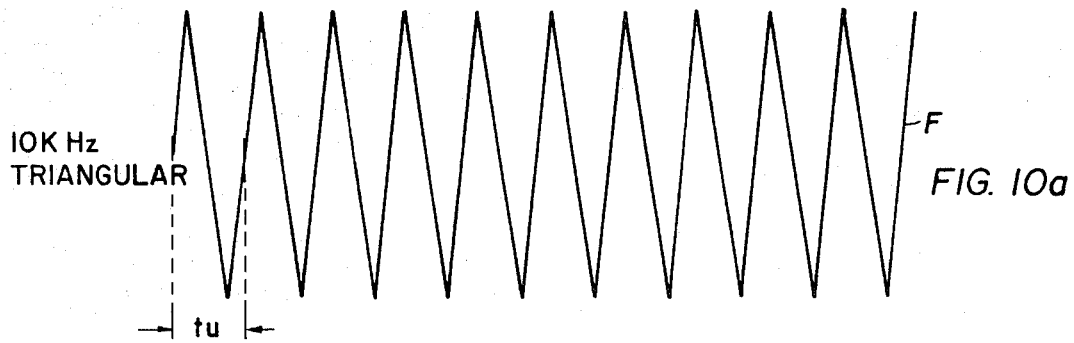
Figure 10B:
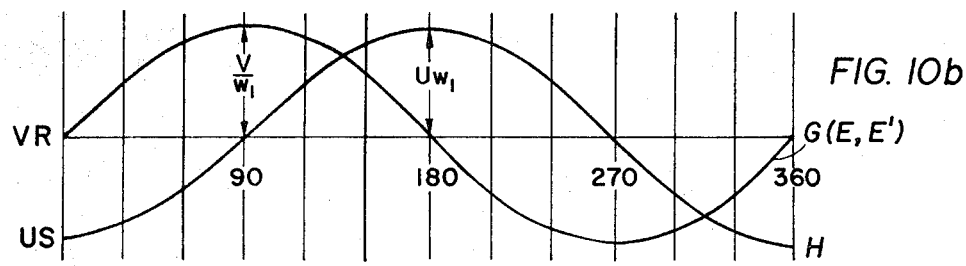
Figure 10C:
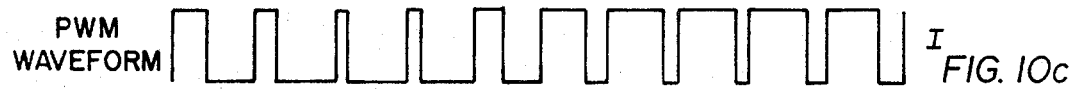
Figure 11A:
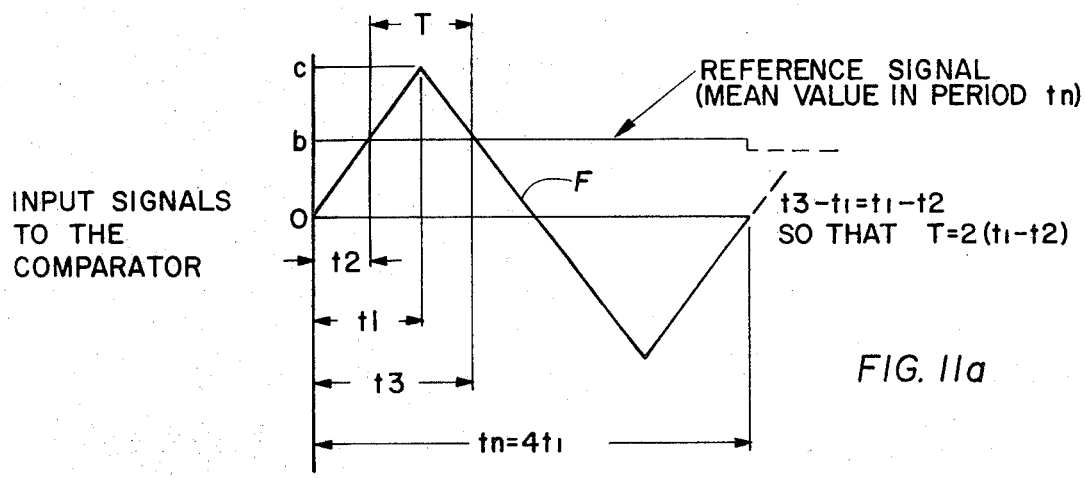
Figure 11B:
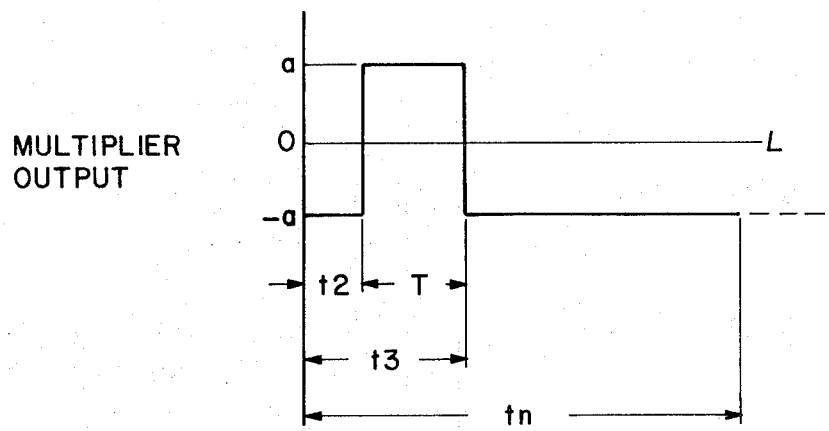
Figure 12:
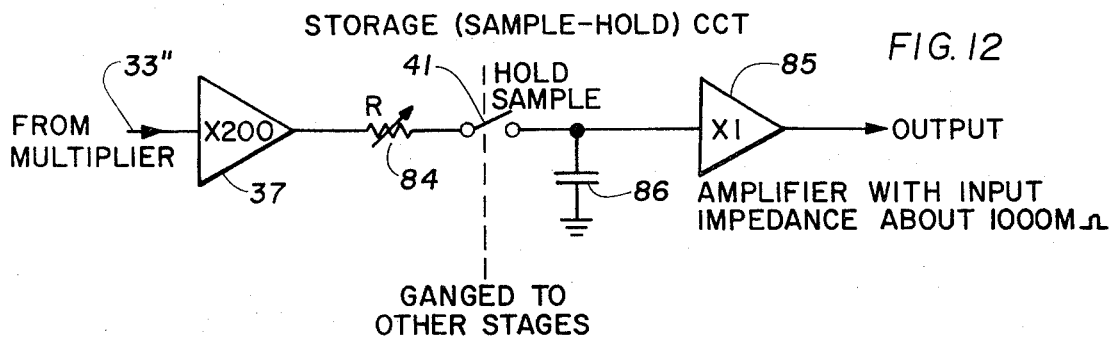
Figure 13:
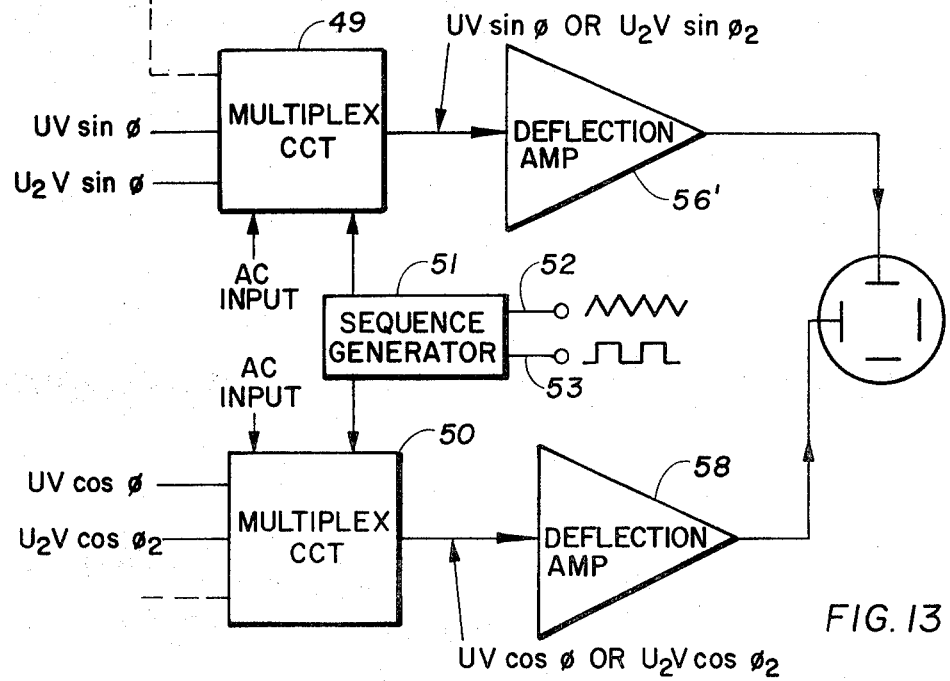
Figure 14:
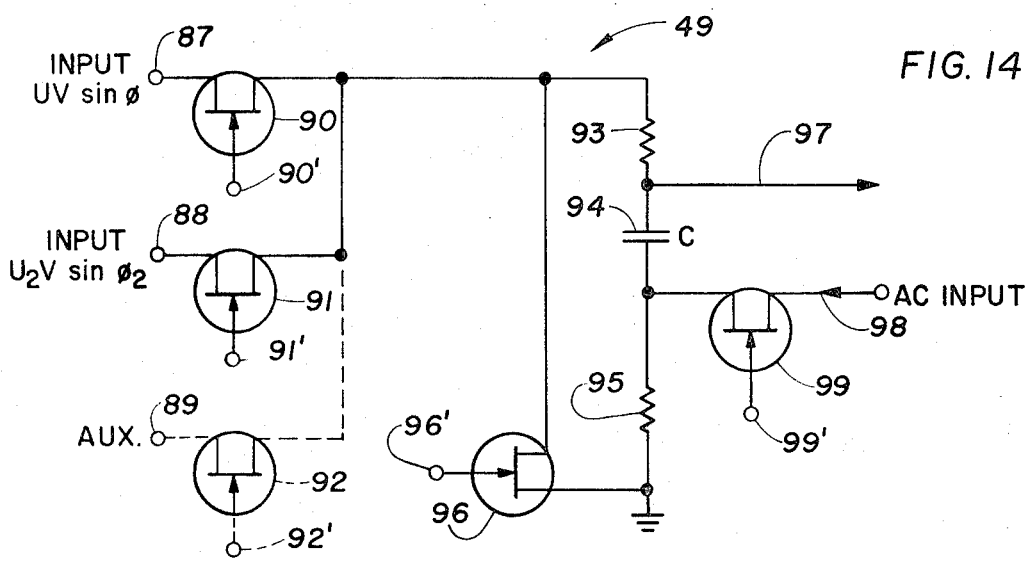
Figure 17:
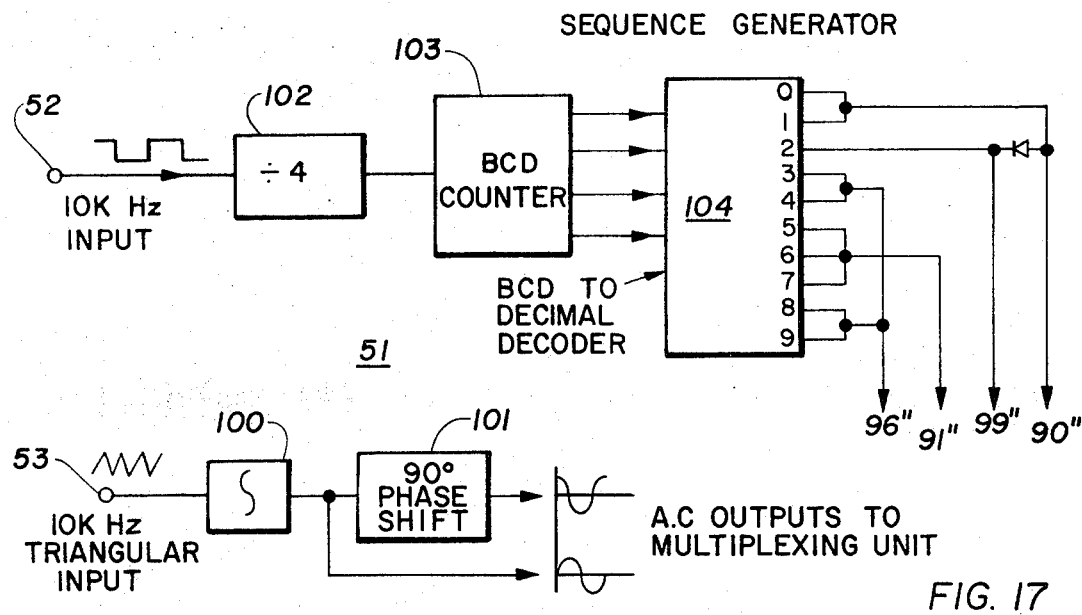
Figure 18:
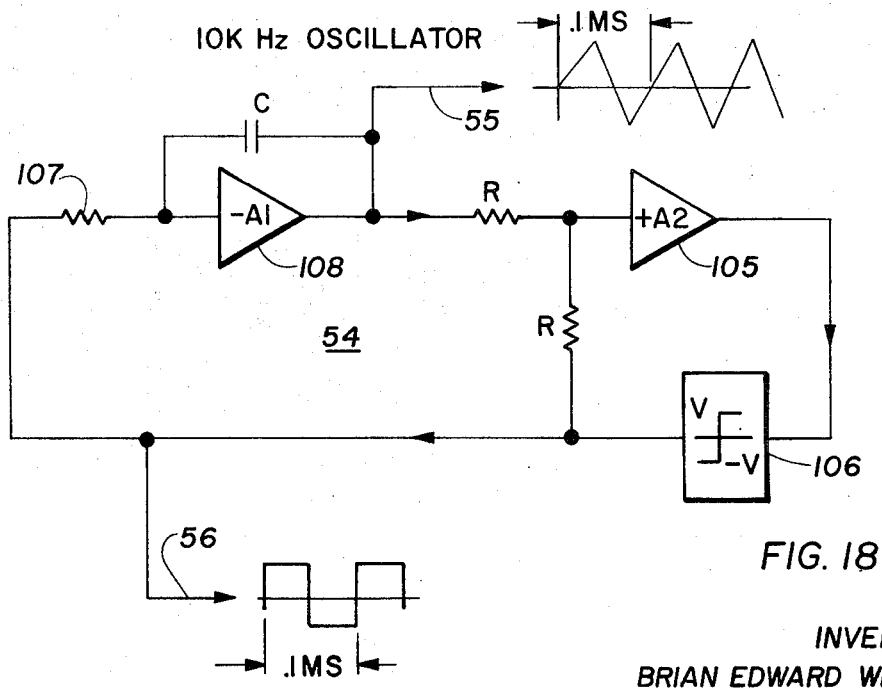

FIGS. 6 and 7 illustrate two sets of signal wave-forms which appear in the analogue section of the reference signal generator whereby the wave-forms of FIG. 6 appear in the sub-section which produces an analogue reference signal which is a sine-wave approximation of the reference pulses, whereas the wave-forms of FIG. 7 appear in the sub-section which produces an analogue reference signal which is a cosine-wave approximation of the reference pulses, only one sub-section is shown since the sub-sections are identical to each other;

FIGS. 8 and 9 show circuit details of the multiplier network shown generally in FIG. 1, wherein the analogue reference signals and the analogue unbalance representing signals are multiplied to produce signals suitable for further evaluation, control and/or display;

FIGS. 10a to 10e illustrate wave-forms which appear in the circuits of the multiplier stage;

FIG. 11a illustrates a triangular wave-form as applied to one of the plurality of inputs of the multiplier network for producing a pulse width modulated waveform shown in FIG. 10c;

FIG. 11b shows the wave-form at the multiplier output terminals;

FIG. 12 illustrates a circuit diagram of the storage means shown in block form in FIG. 3;

FIG. 13 is a more detailed block diagram of the multiplex and sequence circuits of FIG. 3;

FIG. 14 shows a circuit diagram of one of the multiplex circuits of FIG. 3, these multiplex circuits being identical to each other;

FIGS. 15 and 16 illustrate the vector display on a cathode ray tube substantially in the manner of a plan position indicator;

FIG. 17 is a more detailed block diagram of the sequence generator also shown generally in FIGS. 3 and 13; and FIG. 18 is a circuit diagram of a 10 kHz oscillator which generates the square wave and triangular waveforms as used in the block diagrams of FIGS. 2 and 3.

DESCRIPTION OF EXAMPLE EMBODIMENTS

Overall Circuit Diagram

The cooperation of the various circuit components will now be described with reference to FIGS. 1, 2, and 3. A workpiece 10 is supported for rotation, for example in bearings 11 and 12. Well known transducer means 13 and 14 are located closely adjacent to said bearings in order to ascertain unbalance conditions in the workpiece and to produce signal components representing said unbalance condition. The transducers may, for example be of the electromagnetic type, wherein the displacement of an input actuator by the distance $x$ in the time $t$ produces an electrical signal proportional to $dx/dt$. When the displacement of the actuator in the transducer 13 or 14 is due to an out-of-balance force acting on the workpiece, the displacement takes the form of U sin $wt$ wherein U is the peak displacement of the actuator or its largest excursion and w is the angular velocity of the workpiece expressed in rad./sec. ($w = 2\pi \times f$, wherein f is the frequency). The respective electrical output signal of the transducer 13 or 14 will then be proportional to Uw cos $wt$, the amplitude Uw of which is proportional to the angular velocity of the workpiece.

The transducer 13 is arranged on the left hand side or plane of the workpiece 10 and will thus be referred to as producing a left hand unbalance signal component. Respective considerations apply to the transducer 14 arranged on the right hand side or plane of the workpiece 10. Thus, the output terminals 13' and 13" of the left hand transducer 13 are connected to left hand plane setting means 13''' whereas the right hand transducer 14 is connected with its output terminals 14' and 14" to a respective right hand plane setting means 14'''.

FIG. 1 further illustrates means for detecting or producing a reference signal which defines a zero rotational orientation of the workpiece. For example, such means may comprise a light source 15, a reflector 16 attached to the surface of the workpiece 10, and a photocell 17 having an output terminal 17' and being arranged to receive a light beam reflected by the reflector 16. The output 17' of the photocell 17 is connected to a photocell amplifier 18 shown in FIG. 2. A contrasting mark, for example in the form of said reflector, will change the light intensity reaching the photocell once during each revolution of the workpiece. The change in light level from low to high intensity is employed as a reference point to define said zero rotational orientation, for example by producing a positive pulse at the output of the amplifier 18 during the high intensity period.

In an alternative embodiment also shown in FIG. 1, the detector for producing a reference signal may comprise an electromagnetic transducer 19 which senses a projection 20 on the workpiece whereby a change in the magnetic flux path of the transducer 19 is produced which in turn is transformed in a respective output pulse.

Referring now to FIG. 2, the output of the photocell amplifier 18 is connected to the input of a reference signal generator 21 which will be described in more detail with reference to FIGS. 4 and 5.

The reference signal generator 21 is connected with its output terminals to reference signal input means of an electronic multiplier circuit 22. The reference signal input terminals of the multiplier 22 are designated by the letters E and E'. The same letters are used to designate the wave-forms which are supplied to these input terminals and which are shown in FIGS. 6 and 7 as will be described in more detail below. Similarly, the unbalance representing signal components are supplied to input terminals H of the multiplier 22 and the respective wave-form is shown in FIG. 10b. The multiplier 22 has a further input F and the respective wave form is shown in FIG. 10a.

The multiplier 22 comprises pulse width modulators 23 and 24 connected to said reference signal inputs E and E' respectively. The pulse width modulators 23 and 24 have further inputs connected to said multiplier input F to which is supplied a triangular wave-form of predetermined frequency, for example 10 kHz. In the shown embodiment, the multiplier comprises four pulse amplitude modulator stages in order to accommodate a left hand unbalance representing signal component and a right hand unbalance representing signal component. However, if only one unbalance representing signal component were to be used, the multiplier would comprise two pulse amplitude modulators. The pulse amplitude modulator 25 is connected with one of its inputs through a left hand signal amplifier 26 to the output of the plane setting means 13'''. The other input of the pulse amplitude modulator 25 is connected through a signal inverter 27 to the same amplifier 26.

The pulse amplitude modulator 28 is arranged in the same manner as the pulse amplitude modulator 25 except that one of its inputs is connected through a right hand signal amplifier 29 to the output of the right hand plane setting means 14''' while its other input terminal is connected to a signal inverter 30 which in turn is connected to said amplifier 29.

The pulse amplitude modulator 31 is connected with its input terminals in parallel to the input terminals of the pulse amplitude modulator 25. Similarly, the pulse amplitude modulator 32 is connected with its input terminals in parallel to the input terminals of the pulse amplitude modulator 28.

The pulse amplitude modulators have further inputs connected to the pulse width modulators which supply the reference signal component. Thus, the pulse amplitude modulators 25 and 28 are connected to the pulse width modulator 24 and the pulse amplitude modulators 31 and 32 are connected to the pulse width modulator 23.

Figure 10D:
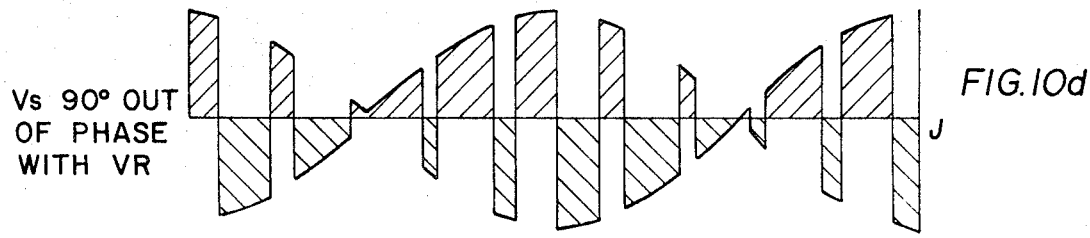
Figure 10E:
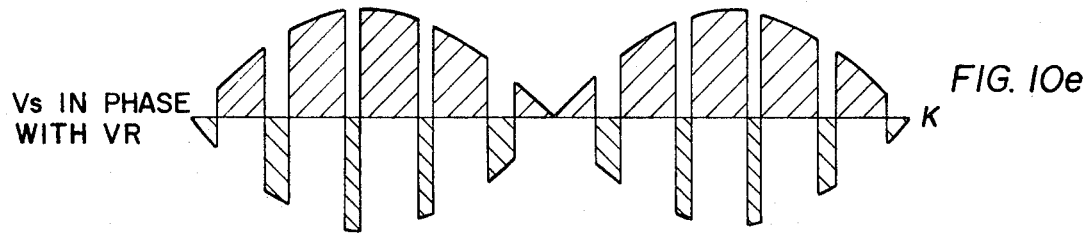

Depending on whether the reference signal component and the unbalance signal component are in phase with each other or out of phase with each other by 90°, the wave-forms J or K shown in FIGS. 10d and 10e will appear at the outputs 25', 28', 31' and 32' of the respective pulse amplitude modulators.

The output stages of the multiplier 22 comprise filters 33, 34, 35 and 36. The outputs 33', 34', 35' and 36' constitute the output terminals of the multiplier circuit.

Referring now to FIG. 3 there are shown circuit means for ascertaining the resulting signal produced in the multiplier circuit 22. These signal ascertaining circuit means comprise high gain amplifiers 37 to 40 having input terminals 33'', 34'', 35'' and 36'' connected to respective output terminals of the multiplier 22. The outputs of the high gain amplifiers are connected to sample-hold switch means 41, 42, 43 and 44. These switch means are ganged to each other and may be operated by any well known means suitable for this purpose.

The sample-hold switch means are connected to respective signal storing circuits 45, 46, 47 and 48. One pair of signal storing means 45, 46 are connected with their outputs to respective input terminals of a first multiplex circuit 49. The other pair of signal storing circuits 47, 48 are connected with their outputs to respective inputs of a further multiplex circuit 50.

The multiplex circuits 49 and 50 have control input terminals connected to a sequence generator 51 which in turn is connected with its two input terminals 52 and 53 to output terminals of a fixed frequency generator 54 shown in FIG. 2. The fixed frequency generator 54 produces a triangular wave-form at its output 55 and a square wave-form at its output 56. The output 55 is connected to the input F of the multiplier 22 and to the input 52 of the sequence generator 51. The output 56 is connected to the input 53 of the sequence generator. The sequence generator 51 will be described below in more detail with reference to FIG. 17. The fixed frequency generator 54, for example a 10 kHz generator, will be described in more detail with reference to FIG. 18.

The multiplex circuit 49 is connected with its output to a vertical deflection amplifier 56' connected to the respective plates of a cathode ray tube 57. The multiplex circuit 50 is connected with its output to a horizontal deflection amplifier 58 which in turn is connected to the respective horizontal deflection plates of said cathode ray tube 57.

The overall function of the just described circuit block diagram will become apparant in connection with the following more detailed description of the structural and functional content of the several circuit blocks shown in FIGS. 2 and 3.

REFERENCE SIGNAL GENERATOR

Figure 4:
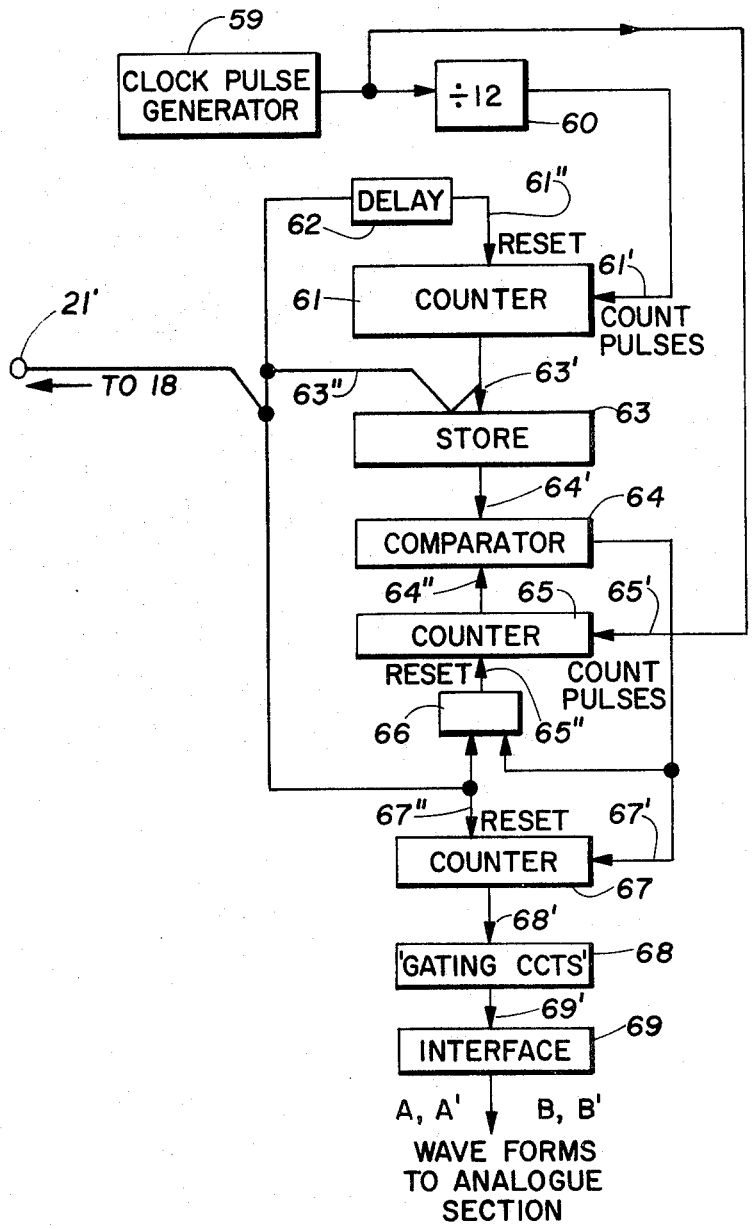
FIG. 4 shows a block diagram of the digital input section of a reference signal generator which receives said digital reference pulses at its input.
Figure 5:
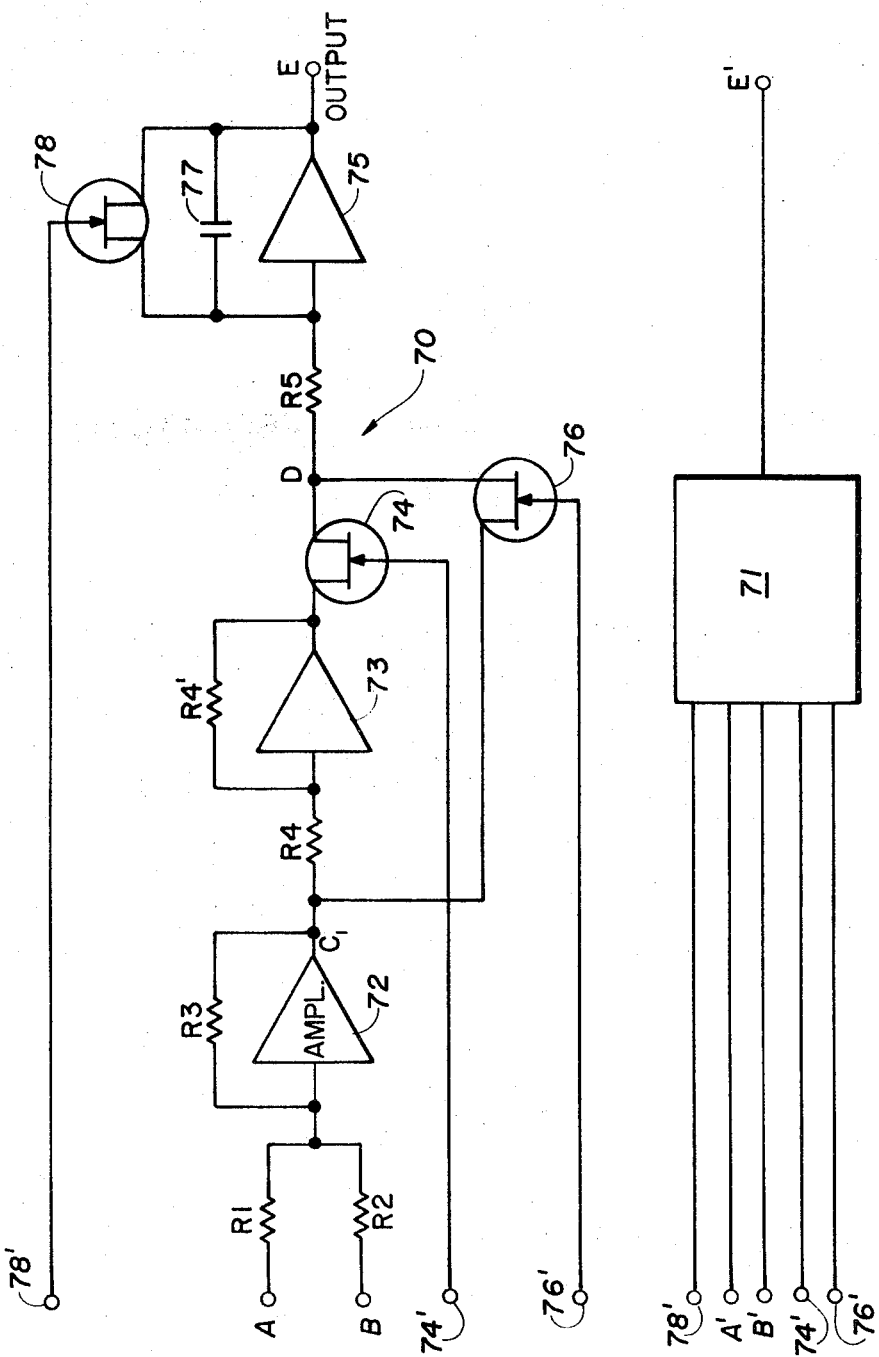
FIG. 5 is a circuit diagram of a sub-section of the analogue output section of said reference signal generator.

Reference is now made to FIGS. 4 and 5 taken in conjunction with the wave-forms diagrams of FIGS. 6 and 7. The reference generator 21 shown generally in block form in FIG. 2, has a digital input section shown in FIG. 4 and analogue sub-sections shown in FIG. 5. Incidentally, in the course of the following description, it will be assumed that a signal can pass through a circuit member when the respective circuit member is considered to be "open."

Referring now to FIG. 4, the input section of the reference generator 21 comprises an input terminal 21' which is connected to the output of the photocell amplifier 18. The digital input section of FIG. 4 comprises a clock pulse generator 59 connected with its output to a dividing circuit 60 which in turn is connected with its output to a counting input 61' of a first counter 61 which has a reset input 61'' connected through delay means such as a delay line 62 to the input terminal 21'. The output of the first counter 61 is connected to coincidence input means 63' of a signal storage 63. The coincidence input means 63' are also connected to the input terminal 21' through a conductor 63''. The output of the signal storage means 63 is connected to the input 64' of a comparator 64 which has a further input 64'' which in turn is connected to a second counter 65. The second counter has a counting input 65' directly connected to the output of the clock pulse generator 59. A reset input 65'' of the second counter 65 is connected through logic circuit means 66 such as an "OR"-gate to the input terminal 21' as well as to the output of the comparator 64. The output of the comparator 64 is further connected to the counting input 67' of a third counter 67. The counter 67 has a reset input 67'' connected to the input terminal 21'. The output of the third counter 67 is connected to the input 68 of gating circuit means 68 which in turn are connected to the input 69' of so called interface circuit 69 for providing the required wave-forms for the analogue output section of the reference generator. Such wave-forms A, A', B, B' are shown in FIGS. 6 and 7.

Referring now to FIG. 5, the analogue output stage of the reference generator 21 comprises two sub-sections 70 and 71. The content of sub-section 71 is the same as that of sub-section 70. Therefore, sub-section 71 is merely shown in block form and the description of sub-section 70 will be sufficient for a full disclosure.

The sub-section 70 comprises input terminals A and B to which are supplied the respective wave-forms shown in FIG. 6. The input terminals are connected through parallel resistors R1 and R2 to the input of a summing amplifier 72 shunted by a resistor R3. The output of the amplifier 72 is connected through a resistor R4 to the input of a signal inverter 73 which is shunted by a further resistor R4'. The output of the inverter 73 is connected through switching means 74 and a resistor R5 to the input of an integrating circuit 75 at the output of which wave-form E, or E' in the case of sub-section 71 appears.

The series connection of resistor R4, inverter 73, and switching means 74 are shunted by further switching or gating means 76. The integrating circuit 75 is shunted by a parallel connection of a capacitor 77 and third switching or gating means 78. The gating means 74, 76, and 78 may, for instance, be field effect transistors connected with their control inputs 74', 76' and 78 to control wave-forms supplied by the output of the interface circuit 69.

The operation of the reference generator 21 will now be described. The input pulses appearing at the input terminal 21' (FIG. 4) have a period tp as shown at the top of FIG. 6. The reference signal generator produces two output wave-forms E and E', both of which are straight line approximations of sinusoidal wave-forms having the period $tp$, one wave-form is a sine wave and the other is a cosine wave. The period tp corresponds to the duration of one revolution of the workpiece 10 and it is equal to the period of the out-of-balance force acting on the workpiece. The peak amplitudes V of the two output wave-forms E and E' are equal to each other and both wave-forms are proportional to the period tp. Under the assumption that the wave-forms are considered sinusoidal as is shown in FIG. 10b with the wave-form G which represents the reference signal VR, the latter may be expressed VR proportional to $V/w$ sin $wt$ and $V/w$ cos $wt$ where $w = 2\pi f_1 = 2\pi/tp$.

Referring to the digital section of the reference generator shown in FIG. 4, the reference period tp is divided into twelve equal portions, that is the reference cycle is divided into 30° sections. It has been found that this results in a sufficiently precise sine and cosine approximation. However, if desired closer approximations may be achieved by providing for smaller sub-dividsions. In any event, the wave-forms generated according to these portions are applied to the analogue section of FIG. 5. The subdivision by twelve produces twelve straight line portions which constitute the sine and cosine wave-forms E and E' shown in FIGS. 6 and 7.

The digital section of the reference generator shown in FIG. 4 receives at its input terminal 21' from the photocell amplifier 18 a series of pulses having the period tp whereby the second counter 65 and the third counter 67 are reset to zero. Further, the value in the first counter 61 is transferred into the signal storing memory 63 whereupon, after a short delay in the delay line 62, the first counter 61 is also reset to zero. During the period tp the first counter 61 receives clock pulses from the clock pulse generator 59 through the divide-by-twelve circuit 60. The value accumulated in the first counter 61 at the end of the period tp is signified by a further input pulse which transfers such value into the memory 63 and the counter 61 is reset as before. Accordingly, the value held in the memory 63 is proportional to the period tp. The second counter 65 receives at its counting input 65' the clock pulses directly from the clock generator 59 and the accumulation in the second counter 65 continues until the count is equal to the value held in the memory 63. This equality is detected by the comparator 64 which in response to said equality generates a pulse for resetting the second counter 65 to zero and for changing the value in the third counter 67 by one digit. Counter 67 is adapted to register twelve positions. The value or count in the second counter 65 again progresses at the rate of the clock pulses until equality is again detected whereby counter 65 is again reset to zero and the value in the third counter 67 is further changed by one digit.

Due to the divide-by-twelve circuit 60, the pulse rate applied to the second counter 65 which receives the clock pulses directly is 12 times the pulse rate applied to the first counter 61. Accordingly, the third counter 67 progresses by eleven digits during the period $tp$.

At the time when the next input pulse is received at the input terminal 21', the comparator 64 should have detected equality for the 12th time during the period and thus the comparator should generate the pulse which would reset the second counter 65 and change the content of the third counter 67 by one digit, whereby the counter 67 is in fact reset to its original value of zero. However, if, for example, due to digiting errors or due to a change in the time interval between successive periods, equality between the value in the memory 63 and the value in the second counter 65 has not been reached or has been reached prior to the arrival of the next input pulse at the input terminal 21', then the input pulse will reset the counter 65 as well as the counter 67 to zero. This feature of the invention insures that the sine and cosine wave-forms produced in the analogue section shown in FIG. 5 start a new cycle each time when an input pulse is received.

The pulses appearing at the output of the third twelve position counter 67 are applied to the input 68 of the gating circuits 68. The gating circuits gate the signals so as to provide input signal wave-forms required by the analogue section of FIG. 5 whereby each signal at a gating circuit output assumes a "0" or "1" level according to the count in counter 67. These binary output levels "0" or "1" form a twelve digit wave-form as the count of the counter 67 progresses through its twelve positions whereby the resulting output wave-forms are repeated for each cycle of the counter 67.

The digital input section of FIG. 4 is connected to the inputs of the analogue output section of FIG. 5 by so called interface circuit stages 69 which convert the digital voltage levels to corresponding levels required in the analogue section.

As mentioned above, the sub-section 71 comprises the same circuit arrangement as shown for sub-section 70. Therefore, only the operation of the sub-section 70 will be described. The wave-forms applied to sub-section 70 are shown in FIG. 6 and the wave-forms applied to sub-section 71 are shown in FIG. 7. Accordingly, it will be noted that sub-section 70 produces a sine approximation whereas sub-section 71 produces a cosine approximation of the reference pulses produced by the photocell.

The wave-form C (or C') appearing at the respective point C each time at the output of the summing amplifier 72 is dependent on the input combination namely the wave-forms A and B and upon the ratio of R1 and R2 which are chosen to satisfy the ratio of 1:2.7314 as nearly as possible, thus if it is assumed that the signal or wave-form A applied to input A produced a voltage at the output of the amplifier 72 of 3.66 V, the signal applied to input B would produce a voltage at point C of 1.34 V. If the signals were applied simultaneously to both inputs A and B, this would produce a voltage of 5 volts at point C.

The wave-form at the output of the inverter is the inverse of the wave-form at point C. Therefore, the wave-form at the output of the inverter 73 is not shown in FIG. 6 and 7.

The switching means 74 and 76 are, for example, field effect transistors which act as gates and which receive their control input signals from the interface stages 69. These field effect transistors 74 and 76 are controlled so that one gate is open when the other gate is closed. Thus, the signals at the output of the amplifier 72 and at the output of the amplifier 73 are gated to produce the wave-form D appearing at the point D shown in FIG. 5.

The wave-form D is supplied to the integrator 95 to produce the straight line approximation of the sine wave E. The break points at 30°, 60° and 90° are 0.5 V, 0.866 V, and 1 V respectively and thus equal to the values given by the sine of these angles.

The field effect transistor 78 which shunts the integrator 75 acts as a gate which is closed during most of the reference period tp, but which is opened for a short time duration when the sine wave should have a zero value that is at 0° and at 180° and so forth. This features assures that each new cycle starts with a zero phase shift even though a slight error might have occured in the reference period, for example due to the digitisation of the reference period. Another advantage of the field effect transistor 78 or rather of its gating function is seen in that small d.c. voltage levels which may be present at the input of the integrator 75 do not cause any significant change in the output level even over long periods of time. The duration of each voltage level in wave-form D depends on the period tp. Accordingly, the longer the reference period, the longer each voltage level of wave-form D is applied to the integrator input and the greater the peak amplitude V of the sine wave approximation.

The sub-section 71 functions substantially as described above with regard to sub-section 70. However, in sub-section 71 the gating switching means corresponding to the switching means 74 and 76 are opened at 90° and 270° when the cosine wave-form should have a zero value.

ELECTRONIC MULTIPLIER CIRCUIT

The wave-forms E and E' are supplied to the respective inputs of the multiplier circuit 22, the function of which will now be described. The present multiplier circuit produces a d. c. output voltage only when the frequencies of the input wave-forms are the same. The signal component or components which represent the out-of-balance information received from the transducer 13 and/or 14 is applied to the inputs H of the multiplier circuit 22. These signals also have a period tp which is equal to the period of one revolution of the workpiece just as the period of the reference signal which is applied to the inputs E and E' of the multiplier. The respective wave-forms G and H are shown in FIG. 10b whereby the wave-form G is an idealized representation of the approximation wave-forms E and E'. The reference signal VR having a peak value $V/wl$ is represented by the wave-form G and the unbalance information representing signal US having a peak value $Uw_1$ is shown by wave-form H in FIG. 10b. If the phase difference between the two input signals is $\Phi$ degrees and if it is assumed that the reference signal is a sine wave then the output of the multiplier 22 is proportional to the mean value of $$Uw_1 \sin(w_1 t + \Phi) \cdot V/w_1 \sin w_1 t$$

wherein $w_1 = 2\pi f_1 = 2\pi/tp$

With the above assumptions for the peak amplitude values of the unbalance signal US and the reference signal VR, the mean value of the multiplier output is proportional to UV cos$\Phi$. If the cosine approximation is applied and if it is assumed that it is an ideal cosine wave-form the multiplier output is proportional to UV sin$\Phi$.

It is an important advantage of the invention that the d. c. output of the multiplier 22 is independent of frequency although the amplitudes of both input signals are frequency dependent. Noise components at frequencies other than the frequency of the reference signal and harmonic components of the unbalance signal which may be superimposed on the unbalance signal will thus not result in an output signal at the output of the multiplier. Thus, the invention has overcome the initially outlined drawbacks of the prior art. It is unlikely that a noise component at the reference frequency will have a sufficient amplitude to produce a significant error since the noise components are associated with the bearings supporting the workpiece and are of high frequency nature.

An example embodiment of the present multiplier circuit is shown in FIG. 8. The pulse width modulators 23 or 24 are embodied by a comparator circuit 79 one input of which is connected to the triangular wave-form output 55 of the oscillator 54 so that the wave-form F shown in FIG. 10a is applied to said one input of the comparator circuit 79. The other input of the comparator circuit 79 receives the reference wave-form E or E'. The output of the comparator circuit 79 produces a pulse width modulated wave-form I shown in FIG. 10c. This wave-form is supplied to a buffer amplifier 80 at the output of which the wave-form I is inverted. The buffer amplifier output is connected to a pulse amplitude modulator, for example 25 as also shown in FIG. 2. The two inputs of the pulse amplitude modulator 25 are connected to receive the unbalance information representing signal and its inverted form as described with reference to FIG. 2. Basically, the multiplication process involves the controlling of the height and width of a voltage pulse by the two input signals so that the area of the pulse represents the product of the input signals. Applying the so controlled pulse to a filter, such as 33, results in a d. c. voltage output the amplitude of which represents the just mentioned area of the pulse.

The multiplier circuit 22 operates as follows, when the wave-forms F, G, and H are applied to the respective inputs of the multiplier circuit stage shown in FIG. 8. For the operation to be described it is assumed that the reference signal VR has a peak value which is always less than the peak value of the triangular wave-form. It is further assumed that the frequency of the triangular wave-form is greater than the reference signal frequency by an order of magnitude. With these assumptions or conditions, the comparator 79 will produce the pulse width modulated wave-form I as mentioned above, please see FIG. 10c. The width of the pulses in the wave-form I depends on the amplitude of the reference signal because the amplitude of the triangular wave-form is greater than the amplitude of the reference signal. The buffer amplifier 80 provides sufficient amplification to increase the amplitude of each pulse in wave-form I so that the increased amplitude approaches the total supply voltage used in the pulse amplitude modulator 25.

An example embodiment of a pulse amplitude modulator, such as 25, is shown in FIG. 9. The pulse amplitude modulator comprises two gating switch means, for example field effect transistors 81 and 82. If the gating field effect transistor 81 acts as the open gate, the signal component to be multiplied is the wave-form H. However, if the gating transistor 82 acts as the open gate, the signal component to be multiplied is the inverse of the wave-form H.

The gating operation of the field effect transistors 81 and 82 is controlled by the pulse width modulated signal at the control input 83 which has an amplitude of $-V$ to $+V$ as indicated in FIG. 9 so that the output signal at the terminal 25' is an amplitude modulated form of the pulse width modulated signal.

If the input signal which represents the unbalance information is considered to be sinusoidal and if there is a 90° phase difference between the unbalance signal and the reference signal, then the amplitude and width modulated pulses appearing at the output 25' have the shape J shown in FIG. 10d. Referring to FIG. 10d, it will be seen approximately that the wave-form J includes an area above the zero line which is equal to the area included below the zero line so that the mean value is zero. The filter 33 is employed to remove the a. c. components present at the output terminal 25' and thus to produce the mean output value. Accordingly, the mean output of the wave-form J is approximately zero which is in agreement with the equation for the multiplier output given above which output is proportional to UV $\cos\Phi$ because in this case $\Phi$ is 90° and $\cos\Phi$ is zero.

On the other hand, if the multiplier input signal represented by wave-form H and representing the unbalance information is of equal amplitude and in phase to the reference signal, the output of the multiplier would be a wave-form K as shown in FIG. 10e whereby again the assumption is made that both wave-forms are sinusoidal. In this case, the area above the zero line and enclosed by the wave-form K is greater than the respective area below the zero line so that the mean output value would be positive. Referring specifically to FIG. 10e it will be noted that the wave-form K has a maximum area above the zero line and a minimum area below the zero line so that its mean value is the maximum positive value. This again agrees with the above equation according to which the multiplier output is proportional to UV $\cos\Phi$ where $\Phi$ is zero degrees so that $\cos\Phi = 1$. And the output is a maximum proportional to UV.

Assuming that the peak amplitude of the triangular wave-form F applied to the respective input of the comparator 79 is 'c' and assuming that its period is $t_n$ and assuming further for the purpose of simplifying the calculations that during the period $t_n$, the reference signal is a. c. signal having the amplitude 'b' while the unbalance representing signal is a d. c. signal having the amplitude 'a,' then the following calculations can be made, whereby it is further assumed that the comparator 79 controls the pulse amplitude modulator 25 in such a manner that the multiplier output signal is at amplitude 'a' during the time 'T', that the triangular wave-form amplitude 'c' is greater than 'b' during the time 'T,' and that during the time $t_n - T$ when the triangular wave-form amplitude is less than 'b' the multiplier output signal is at the amplitude of '−a.' With these assumptions in mind reference is now made to FIGS. 11a and 11b. FIG. 11a shows the time $T = 2(t_1 - t_2)$ where $t_1 = t_n/4$ and $t_2$ is the time at which the rising triangular wave-form amplitude equals 'b.' '$t_3$' is the time at which the falling triangular wave-form amplitude equals 'b.' The triangular wave-form has an initial slope of $ct/t_1$ so that at time $t_2$, $ct_2/t_1 = b$; $t_2 = b/c\ t_1$. Thus $T = 2\ (t_1 - b/c \times t_1) = t_n/2 \times (1-b/c)$ The multiplier output signal is shown in FIG. 11b. Its mean values is $$= 1/t_n\ [aT - a\ (t_n-T)] = a/t_n \times (2T-t_n)$$

$$= a/t_n\ [t_n\ (1-b/c - t_n)] = -ab/c$$

Thus the multiplier output is proportional to the product of the input signals 'a' and 'b' if 'c' is kept constant. Assuming further that 'a' and 'b' represent a mean value of the unbalance input signal US and of the reference input signal VR respectively during the time interval $t_n$, and that $t_n$ is made very much smaller than $t_p$ then 'a' and 'b' approximate over the period $t_p$ to U sin $(wt + \Phi)$ and V sin wt respectively, whereby $\Phi$ represents the phase difference between the unbalance signal and the reference signal and wherein $w = 2\ \pi f = 2\pi/t_p$.

Applying the above conditions, the mean value of the multiplier output may be calculated as follows:

$$= \frac{1}{t_p} \int_0^{t_p} \frac{ab}{c} dt = \frac{1}{t_p} \int_0^{t_p} \left( \frac{U \sin(wt + \Phi) \cdot V \sin wt}{c} \right) dt$$

$$+ \frac{UV}{ct_p} \int_0^{t_p} (\sin^2 wt \cos \Phi + \sin wt \cos wt \sin \Phi) dt$$

$$= \frac{UV}{2ct_p} \int_0^{t_p} [(1 - \cos 2wt) \cos \Phi + \sin 2wt \sin \Phi] dt$$

$=UV/2ct_p$ [$t \cos\Phi - \sin 2wt \cos \Phi/2w - \cos 2wt \sin \Phi/2w$ ] $t_p$ mean output value of multiplier $= UV/2c \cos \Phi$.

In practice it is not necessary to restrict the input signals to those having a period $t_p$ very much greater than the period $t_n$ of the triangular wave-form F since the multiplier output signal is capable of responding to changes in $a$ and $b$ during the period $t_p$ as may be seen from FIG. 10. The restriction $t_p$ very much larger than $t_n$ in the above calculations for sinusoidal inputs resulted from the condition that signals $a$ and $b$ were to be constant during the period $t_n$.

Since the peak amplitude of the triangular wave-form is constant it follows that the mean output of the multiplier circuit is proportional to $UV \cos \Phi$.

DISPLAY MEANS

For the majority of balancing purposes it is necessary to display the radius and reference angle at which the correction mass must be applied for properly balancing the workpiece. The radius here involved extends from the center line or axis of rotation of the workpiece and the reference angle defines a zero rotational orientation of the workpiece. These two quantities, namely the required correction mass and the reference angle could be displayed on separate meters. However, a more versatile approach is achieved by displaying these quantities in polar form on a cathode ray tube as disclosed by the present invention.

According to the invention a polar form of display is achieved by multiplying the signal derived from the transducer in one multiplier by the reference signal approximating the sine wave and in a second multiplier by the reference signal approximating the cosine waveform. As mentioned, the outputs from these multipliers will be proportional to $UV \cos\Phi$ and $UV \sin\Phi$. If the multiplier output signal which is proportional to $UV \sin\Phi$ is applied, preferably with suitable amplification, to the vertical deflection plates of the cathode ray tube and if the signal proportional to $UV \cos\Phi$ is applied to the horizontal deflection plates of the cathode ray tube, preferably also after suitable amplification, the length of the vector y shown in FIG. 15 is proportional to UV. Referring further to FIG. 15, the phase angle $\theta$ of the vector y is given as $\tan \theta = UV \sin \Phi/UV \cos \Phi$ so that $\theta = \Phi$ the phase angle between the unbalance component and the reference mark on the workpiece.

Since the magnitude of the vector y as displayed is proportional to $UV$ and since the reference component V is constant as explained above in connection with the description of the reference generator, it follows that the magnitude of the vector display is proportional to U which represents the peak value of the workpiece displacement from its center line. Further, this displacement is proportional to the unbalance "couple" namely an out-of-balance mass times the radius at which the out-of-balance mass is considered to act. Accordingly, it is possible to calibrate the display, for example by means of a calibration graticule shown in FIG. 16. The calibration is performed by placing a known mass $m_1$ at a radius $r_1$ on the workpiece which for the calibration is a balanced rotor having said radius $r_1$. If now the rotor is rotated the respectively displayed vector is a measure for the unbalance caused by the known mass $m_1$, whereby the entire apparatus is calibrated with regard to this known mass $m_1$. If thereafter an unknown mass $m_2$ is applied at the radius $r_2$ but in the same plane the display will change, for example by an amount y. The following formula applies:

$$m_1 r_1/x = m_2 r_2/y$$

From this formular $m_2$ is ascertained as follows:

$$m_2 = y/x \cdot r_1/r_2 \cdot m_1$$

Usually the calibration test is performed with the radius $r_1$ corresponding to the radius at which the unbalance compensating mass must be applied so that $r_1 = r_2$. Accordingly, $m_2$ may be expressed as follows:

$$m_2 = y \, m_1/x$$

By superimposing the above mentioned graticule on the display a $m_1/x$ becomes mass per division of the display. As a result, the required compensating mass becomes equal to the magnitude of the vector display resulting from the unbalance times the factor mass per division obtained from the calibartion test. It is shown above that after the just described initial calibration procedure the magnitude of the vector display times a scale determined during the calibration represents the mass required for balancing the workpiece. Thus, after the initial calibration the mass to be applied and the angle at which it is to be applied are directly represented by the magnitude and the phase respectively of the vector display as shown in FIGS. 15 and 16. This is an important advantage of the invention over the prior art.

In those instances where the balancing machine comprises two transducers, one for the left hand (LH) and for the right hand (RH) support of the workpiece it is necessary that the two resulting displays can be readily distinguished from each other. In this instance, two balancing planes are selected on the workpiece to which the appropriate unbalance readings can be applied. Means for the plane setting are well known in the art in connection with balancing machines and will ensure that each of two vector displays represents only the correction to be applied to the respective plane.

According to the invention, a circle is superimposed at the end of one of the vectors in order to distinguish the two vectors from each other. This is shown in FIG. 16.

In order to accommodate two transducers, the multiplier 22 shown in FIG. 2 is provided with the additional pulse amplitude modulators 28 and 32. The pulse width modulator sections are the same. Accordingly, two components are generated which are proportional to $U_2 V \cos \Phi_2$ and $U_2 V \sin \Phi_2$ resulting from the second transducer 14.

A multiplex sequence generator circuit is added to the display circuit shown in FIG. 3. The sequence generator is shown in more detail in FIG. 17. The sequence generator controls the application of the signal components to the cathode ray tube so as to give the form of display shown in FIG. 16.

Each multiplier output feeds into a storage and sample-hold circuit shown in FIG. 12. This circuit comprises as its input a relatively high gain amplifier, for example 37 connected with its input 33'' to the respective output 33' of the multiplier 22. The output of the high gain amplifier 37 is connected through a variable resistance 84 to the respective sample-hold switch, for example 41. The sample-hold switch is connected to the input of a further amplifier 84 having a high input impedance of about 1,000 MΩ and it is also grounded through a capacitor 86. The amplifier 37 provides the amplification required to bring the signal levels available at the multiplier output to the levels required for display on the cathode ray tube. Providing the amplifiers 37, 38, 39 and 40 simplifies the storage, multiplex, and sequence circuits.

The variable resistor 84 and the capacitor 86 provide an adjustable filtering action and operate in conjunction with the respective multiplier filter, for example 33. After a balancing operation, the switch 41 providing the sample and hold operation is opened and the charge on the capacitor 86 is stored or maintained for a time long enough to correct the unbalance. For this purpose, the input impedance of the amplifier 85 has the above mentioned high value. The output impedance of the amplifier 85 is relatively low, approximately 10 ohms and suitable for connection to other equipment including automatic balancing instrumentation not shown.

The multiplex and sequence circuit is shown in FIG. 13. The multiplex unit comprises two identical sections 49 and 50. Therefore, it will be sufficient to describe one of these sections with reference to FIG. 14. FIG. 14 shows a multiplex circuit section comprising input terminals 87, 88, and 89 formed by switching means such as controllable field effect transistors 90, 91, and 92 having control inputs 90', 91', and 92'. These control inputs of the field effect transistors are connected to respective outputs of the sequence generator shown in FIG. 17 and to be described below. The transistors act as gates. When the gate is open the signal can pass through the gates. The transistors 90 and 91 are opened and closed alternatively to first apply the two signal components, one for vertical deflection and the other for horizontal deflection, relating to one transducer to the deflection circuits and then to apply after a short time interval the two components relating to the second transducer also to the deflection cirucits. After another time interval, the first set of signals is re-applied to the deflection circuits and so forth.

The multiplex circuit further comprises an output circuit including a series connection of a resistor 93, a capacitor 94 and a further resistor 95. This series connection is connected in parallel to a further gating transistor 96 having a control input 96'. An end of the just described series and parallel connection is connected to the input switching gates and the other end is grounded as seen in FIG. 14. An output terminal 97 connected to the respective deflection circuits is provided at the junction between the resistor 93 and the capacitor 94. An a. c. input 98 is connected through a further controllable switch such as a field effect transistor 99 to the junction between the capacitor 94 and the resistor 95. The transistor 99 has a control input 99' also connected to the respective output of the sequence generator, (FIG. 17).

The capacitor 94 and the resistor means 93, 95 cause the deflection circuit voltage to rise exponentially from zero to the input signal amplitude. If the same capacitor resistor values are used in both sections 49 and 50 of the multiplex circuit, the beam of the cathode ray tube is deflected linearly from its central position on the screen to the position given by the input signal amplitudes representing the unbalance information. The time constant resulting from the resistors 93 and 95 and the capacitor 94 corresponds to the capacity times the sum of these resistors.

The cathode ray tube beam is linearly returned to its central position by removing the input signal through appropriately switching either transistor 90 or 91 and by making the transistor 96 conductive to discharge the capacitor 94 through the resistors 93 and 95 which results in an exponential decrease of the deflection voltage. Thus, the display on the screen of the cathode ray tube is provided in the form of a straight line of uniform brilliance originating at the center of the polar coordinate system and the length of which is determined by the input signal levels. The same sequence of steps is applied with regard to the next set of input signals produced by the second transducer 14. However, now the switch 99 is made conductive at the time when the deflection voltage will be or is very near to the input voltage level. When the transistor 99 conducts a sinusoidal voltage having a 90° phase difference relative to the voltage applied to the vertical and horizontal sections, is applied through the capacitor 94 to the deflection circuits whereby a circle is superimposed at the end of the display representing the second vector. In this manner the two vectors are distinguishable from each other. Further inputs, as may be required for indicating the depth of a drilling operation can be employed if the sequence operation is modified by the inclusion of further field effect transistors which would be connected in parallel to the transistors 90 and 91. One such transistor 92 is shown in FIG. 14. In this case, the sequence generator would provide a further control output to be applied to the control input 92'.

The sequence generator 51 is shown in more detail in FIG. 17. The input 53 of the sequence generator 51 is connected to the triangular wave output 55 of the fixed frequency oscillator 54. The sequence generator comprises, connected to its input 53, an integrating circuit 100 and a phase shifting circuit 101 which provide at their respective outputs the a. c. sine and cosine wave-forms supplied to the multiplex circuits 49 and 50.

The input 52 of the sequence generator is connected to the output 56 of the fixed frequency oscillator 54 to supply the square wave-form to a divide-by-four circuit 102 whereby the square wave-form of, for example 10 kHz is reduced to a frequency of 2.5 kHz. The divide-by-four circuit 102 comprises two cascaded binary counters and is connected with its output to a binary coded digit or decimal counter 103 which provides four outputs connected to a binary coded digit to decimal decoder 104 having outputs o and 1 to 9. These outputs are interconnected so as to provide the terminals 90'',91'',96'' and 99'' connected to the respective inputs of the multiplex circuits, whereby the sequence generator operates these multiplex circuits for producing the desired vector display cycles in the correct sequence.

The fixed frequency oscillator 54 is shown in detail in FIG. 18. The oscillator comprises a Schmitt trigger circuit 105, the output of which is supplied to a signal limiting device 106 which delivers at its output 56 the square wave-form having a period of 0.1 ms. The output of the limiter 106 is further connected through a resistor 107 to an integrating circuit 108, the output of which delivers at terminal 55 the triangular wave-form having also an 0.1 ms period for example. The integrator circuit 108 provides a ramp voltage of high linearity. When the ramp voltage exceeds the amplitude of the output at the limiter 106, the Schmitt trigger 105 switches to give an opposite polarity output and hence an accurate triangular wave-form is generated.

Although the invention has been described with reference to specific example embodiments, it is to be understood that it is intended to cover all modifications and equivalents within the scope of the appended claims.

I claim:

1 An electronic circuit arrangement for producing an output signal representing several information components, from input signals which individually represent said information components, especially for the control of an automatic balancing machine, comprising: first means for providing a component signal representing a first information, second means for providing another component signal representing a second information, an electronic multiplier circuit including first and second inputs and output means, means for connecting said signal component providing means to the first and second inputs of the multiplier circuit, and signal ascertaining means connected to the output means of said electronic multiplier circuit, said first means comprising transducer means for providing a component signal representing an unbalance information regarding a workpiece to be balanced, said second means comprising reference signal generating means for providing said other component signal representing a reference information for the angular displacement of an unbalance force relative to a zero rotational orientation of said workpiece, said reference signal generating means comprising a reference signal source to produce digital signals for marking said zero rotational orientation of said workpiece in response to the rotation of said workpiece, and a reference generator operatively connected to said reference signal source, said reference generator comprising a digital input section and an analogue output means, said digital input section comprising a reference signal input terminal connected to said reference signal source, a clock pulse generator, a first counter having a counting input and a reset input as well as an output, a dividing circuit having an input connectd to said clock pulse generator for dividing said clock pulses by a predetermined number, said dividing circuit having an output connected to said counting input of the first counter, a signal delay means connected between said reference signal input terminal and said reset input of the first counter, signal storage means having an output and coincidence input means connected to said reference signal input terminal and to the first counter output whereby the count of the first counter is transferred into said signal storage means in response to the occurrence of a reference signal at said input terminal, comparing means having two inputs and an output, a second counter having a counting input, a reset input, and an output connected to one input of said comparing means, means for connecting the clock pulse generator output to the counting input of said second counter, means for connecting the output of the signal storage means to the other input of said comparing means whereby the comparing means produces an output signal when the content of the storage means and the count of the second counter are equal to each other, an "OR"-gate having an output connected to the reset input of the second counter, a first input connected to the output of said comparing means, and a second input connected to said reference signal input terminal whereby said second counter is resettable by the comparing means output or by the reference signal, a third counter having a reset input, a counting input, and an output, means for connecting the reset input of the third counter to the reference signal input terminal, means for connecting the counting input of the third counter to the output of the comparing means, and digital to analogue converting means connected between the output of said third counter and said analogue output means, said converting means comprising a plurality of output terminals.

2 The electronic circuit arrangement according to claim 1, wherein said analogue output means comprise two sub-sections, each subsection comprising two parallel input means, first, second, and third gating inputs, a reference signal output terminal, a series circuit connected between said two parallel input means and said reference signal output terminal, said series circuit comprising signal summing means, signal inverter means, first gating means, and signal integrating means, said first gating means having a control input connected to the first gating input, second gating means connected to shunt said signal inverter means as well as said first gating means and having a control input connected to the second gating input, third gating means connected to shunt said signal integrating means and having a control input connected to the third gating input, and means for connecting said first, second, and third gating inputs as well as said two parallel input means to respective ones of said plurality of output terminals.

3 The electronic circuit arrangement according to claim 1, wherein said digital to analogue converting means comprise gating circuit means connected to said third counter output, and interface circuit means connected between said gating circuit means and said plurality of output terminals.

4 The electronic circuit arrangement according to claim 1, wherein said reference generator converts said digital signals into approximations of sine and cosine wave-forms having a freguency corresponding to the rotation of the workpiece, said electronic multiplier circuit comprising an analogue multiplier connected to said transducer means and to said reference generator for producing a multiplier output signal in response to frequency components common to said wave-forms and to said unbalance information representing signal component.

5 The electronic circuit arrangement according to claim 1, wherein said signal ascertaining means comprise a cathode ray tube and means for connecting the cathode ray tube to the multiplier circuit output means.

6 The electronic circuit arrangement according to claim 1, wherein said analogue multiplier produces said multiplier output signal only when the signal components present at its inputs have the same frequency.

7 The electronic circuit arrangement according to claim 6, wherein the analogue multiplier produces said multiplier output signal to be proportional to $UV\cos\Phi$, wherein $\Phi$ is the phase angle between the unbalance representing signal component and the reference signal component, wherein U represents the peak value of the unbalance signals US, and V represents the peak value of the reference signals VR.

8 The electronic circuit arrangement according to claim 1, wherein said reference signal source is a photocell arranged to receive light signals from the rotating workpiece for defining said zero rotational orientation of the workpiece and having a frequency corresponding to the rotation of the workpiece.

9 The electronic circuit arrangement according to claim 1, wherein said reference signal source comprises an electromagnetic reference transducer arranged for sensing a projection on the workpiece which projection causes a change in the magnetic flux of the reference transducer which in turn produces a series of reference pulses.

10 The electronic circuit arrangement according to claim 1, wherein said transducer means for producing said unbalance information representing signal component comprises input means displaceable by an unbalance force and electromagnetic means for producing said unbalance signal component as a function of the displacement of said input means with respect to time, whereby the unbalance signal may be expressed as $Uw\cos wt$, wherein the amplitude $Uw$ is proportional to the angular velocity of the workpiece.

11 The electronic circuit arrangement according to claim 1, wherein said electronic multiplier circuit comprises several parallel stages for accommodating a plurality of unbalance representing signal components.

12 An electronic circuit arrangement for producing an output signal representing several information components, from input signals which individually represent said information components, especially for the control of an automatic balancing machine, comprising: first means for providing a component signal representing a first information, second means for providing another component signal representing a second information, an electronic multiplier circuit including first and second inputs and output means, means for connecting said signal component providing means to the first and second inputs of the multiplier circuit, and signal ascertaining means connected to the output means of said electronic multiplier circuit, said first means comprising transducer means for providing a component signal representing an unbalance information regarding a workpiece to be balanced, said second means comprising reference signal generating means for providing said other component signal representing a reference information for the angular displacement of an unbalance force relative to a zero rotational orientation of said workpiece, said electronic multiplier circuit comprising pulse amplitude modulating means having an output and three inputs one of which forms said first input of the multiplier circuit connected to said first component signal providing means, signal inverting means connected between said first component signal providing means and a second input of the respective pulse amplitude modulating means, pulse width modulating means having an output and two inputs, one of said two inputs of the pulse width modulating means forming the second input of the multiplier circuit connected to said second component signal providing means, a wave-form generator connected to the other input of said two inputs of the pulse width modulating means, said pulse width modulator output being connected to the third input of the pulse amplitude modulating means, and filter means connected with an input to the output of said pulse amplitude modulating means, said filter means having an output representing said output means of the multiplier circuit, whereby an output signal is produced at said filter output, the amplitude of which represents the area of the product.

13 The electronic circuit arrangement according to claim 12, wherein said wave-form generator is a 10 kHz generator comprising means for generating a triangular wave-form.

14 The electronic circuit arrangement according to claim 12, wherein said pulse amplitude modulating means comprises two field effect transistors arranged to act as gates whereby one gate is conducting when the other is non-conducting and vice-versa.

15 The electronic circuit arrangement according to claim 12, wherein said pulse width modulator comprises a comparator circuit and a buffer amplifier connected between said comparator circuit and the third input of said pulse amplitude modulating means.

* * * * *

UNITED STATES PATENT OFFICE
CERTIFICATE OF CORRECTION

Patent No. 3,752,021         Dated August 14, 1973

Inventor(s) Oswald Klien, Gert Klien and Paul Marte

It is certified that error appears in the above-identified patent and that said Letters Patent are hereby corrected as shown below:

<u>Title page</u>, please insert:

--Priority: Austrian application A 5342/70, filed June 12, 1970.--

Column 1, line 13, after "process", insert --is--.

Column 1, line 30, correct the spelling of "superior".

Signed and sealed this 25th day of June 1974.

(SEAL)
Attest:

EDWARD M. FLETCHER, JR.
Attesting Officer

C. MARSHALL DANN
Commissioner of Patents